United States Patent
Greene et al.

[15] 3,645,143
[45] Feb. 29, 1972

[54] WHEEL SPINNER

[72] Inventors: Aubrey E. Greene; F. F. Layfield, both of Ellaville, Ga. 31806

[22] Filed: Sept. 25, 1970

[21] Appl. No.: 75,340

[52] U.S. Cl. ................................................74/14, 74/206
[51] Int. Cl. ..................................F16h 37/00, F16h 13/02
[58] Field of Search ...........................74/14, 202, 206, 199

[56] References Cited

UNITED STATES PATENTS 2,923,149  2/1960  MacMillan...........................74/14 X

*Primary Examiner*—Leonard H. Gerin
*Attorney*—Edwin E. Greigg

[57] ABSTRACT

A wheel spinner for driving and braking the wheels of a vehicle for balancing the same or making measurements thereon comprising a frame with a spinning drum driven by a motor and a brakeshoe. A control lever is connected by linkages to the brake as well as to feet for mounting the spinner and has a forward position in which the brake is retracted and the spinner advanced on its pivoted feet by means of the linkages and a rear position, in which the spinner is rocked backward on its feet and the brakeshoe is advanced towards the vehicle wheel for braking. Between the two active positions, the control lever has a neutral position. The brake is operated with lost motion when the lever moves from neutral to the backward position.

5 Claims, 5 Drawing Figures

PATENTED FEB 29 1972

INVENTORS
AUBREY E. GREENE
F. F. LAYFIELD

BY *Elwin E. Greigg*

ATTORNEY

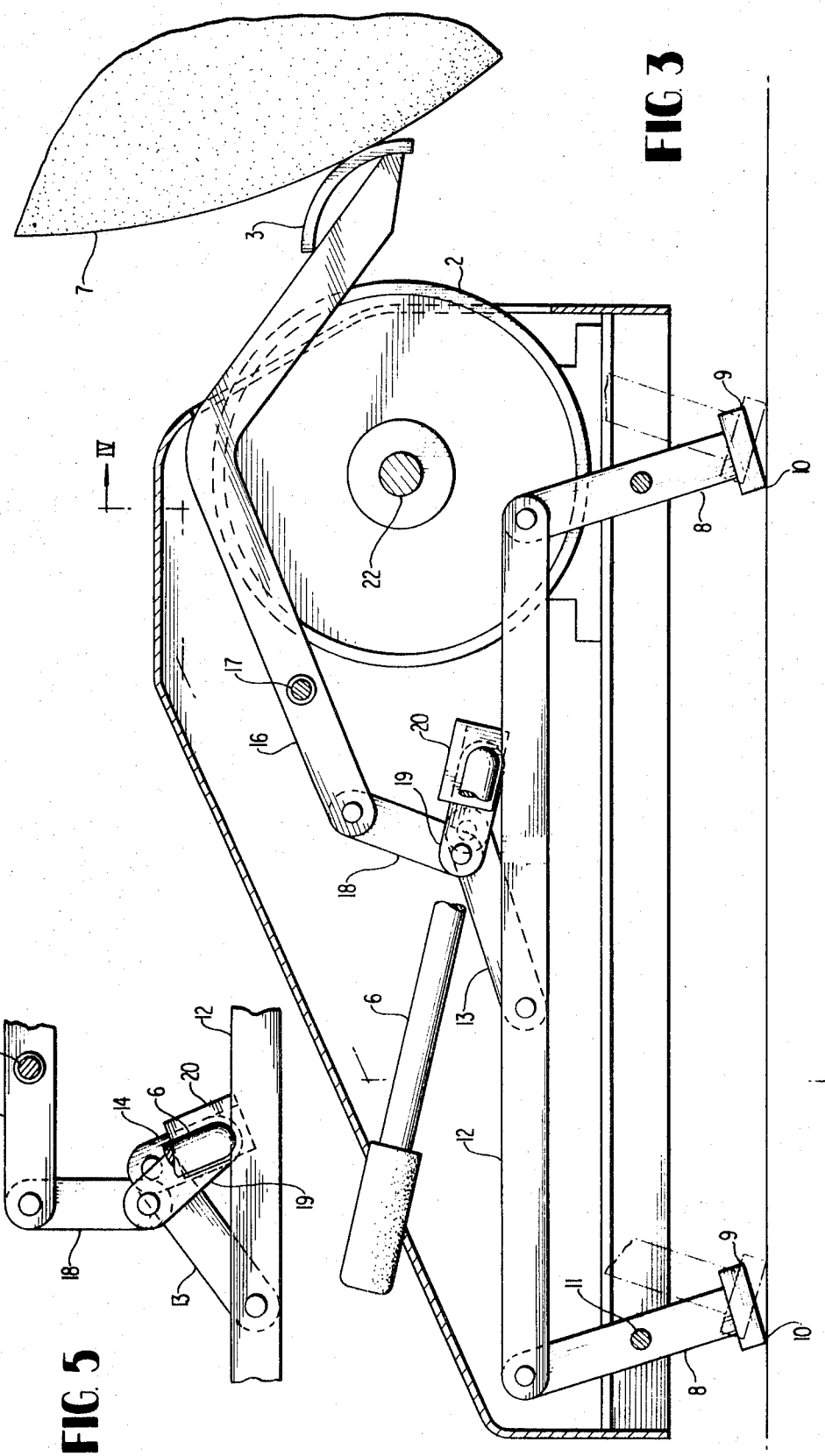

WHEEL SPINNER

FIELD OF THE INVENTION

The invention relates to wheel spinners for spinning the wheels of a jacked-up motor vehicle for making measurements or for wheel balancing, for instance, and for braking the wheel subsequent to conclusion of the measurement.

BACKGROUND OF THE INVENTION

In wheel spinners which are used in workshops, ease of handling and robustness are prime requirements. To facilitate operations, the spinner should be easy to switch from the driving to the braking position and from either of these to a neutral position. Preferably, all of these types of operations should be available by actuation of a single control lever.

The spinner, when engaging a wheel either for driving or for braking the same, should be firmly positioned and to achieve this, it should have a good grip on the supporting surface on which it is mounted. Also, the number and weight of the movable units on the spinner should be as small as possible, contributing to robustness and long life of the apparatus.

It is a primary object, therefore, of the present invention to provide a wheel spinner which is of robust construction adapted to stand up to heavy duty work.

A further object of the invention is to provide a wheel spinner which is easy to handle and to move from one location to another of a workshop or the like.

A still further object of the invention is to achieve facility of operation by providing a single control having a plurality of positions corresponding to different types of operations.

Other objects of the invention are to make the spinner grip the supporting surface firmly when engaging a vehicle wheel, so as to achieve maximum driving effect.

These and other objects of the present invention, together with their attendant advantages, will become readily apparent from the following description taken in conjunction with the accompanying drawing.

BRIEF DESCRIPTION OF THE DRAWING

FIG. 3 is a cross section generally corresponding to FIG. 2 but on a somewhat enlarged scale showing the spinner in the braking position;
FIG. 5 is a detailed view of part of the linkage mechanism.

DESCRIPTION OF THE EMBODIMENT

Figure 1:
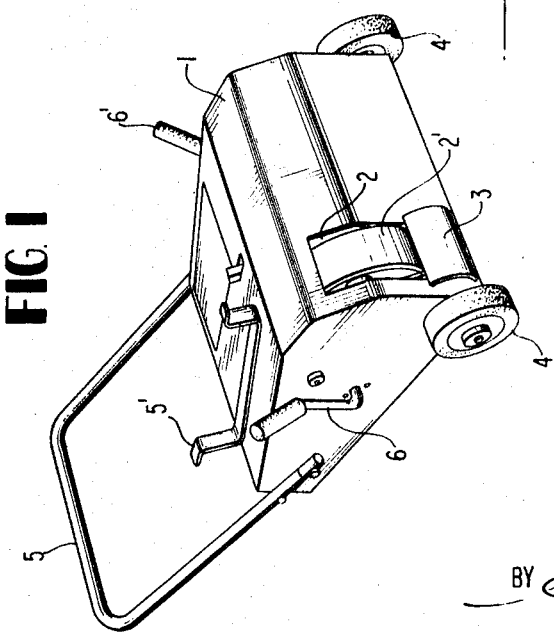
FIG. 1 is a perspective view of the improved wheel spinner.

As is shown in FIG. 1, the wheel spinner comprises a frame structure or housing 1, through an aperture 2 of which a spinning drum 2' protrudes and can be brought into engagement with a wheel of a vehicle to determine any unbalanced condition thereof. Immediately below spinning drum 2' there is visible a pivotably mounted brakeshoe in retracted position. Provided on the front end of frame structure 1 are wheels 4—4 and on the rear thereof a handle 5 for moving the apparatus on a floor or the like. Also visible and mounted on opposite sides of the frame structure are a pair of control levers, 6, 6', by means of which the wheel spinner can be operated to bring the drum 2' into contact with a vehicle wheel 7 in one position of lever 6 or, in another position, to make brakeshoe 3 engage the wheel for braking the same. Between the several operating positions a neutral position is provided. There is also shown a cord retainer 5' for winding up an electric cord (not shown) when the wheel spinner is not in operation.

Figure 2:
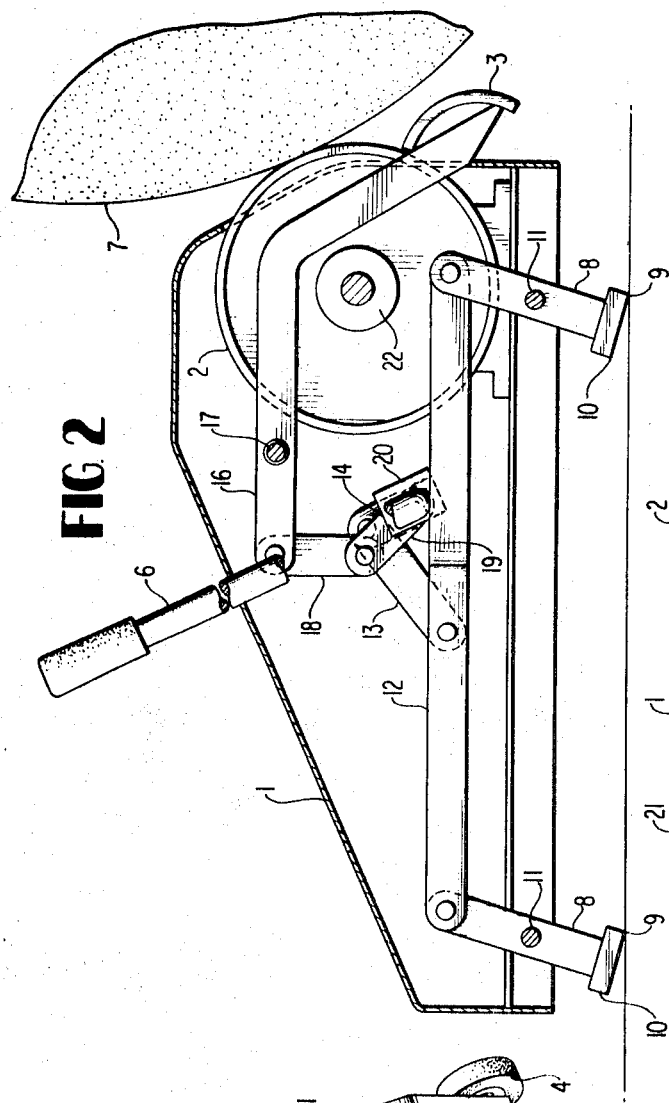
FIG. 2 is a cross section of the spinner with the spinning drum engaging a vehicle wheel.

FIG. 2 shows a cross section of the wheel spinner in operative position for driving a vehicle wheel indicated schematically and designated as 7. As is apparent from FIG. 2, the wheel spinner in its operating position is mounted on a group of four feet designated at 8—8, two of which are mounted at the front portion of the housing with the other two supporting the rear extremity thereof and all of the feet being provided with mounting means in the form of rectangular pads or plates having forward and rearward frictional edges 9 and 10, respectively.

As is also apparent from FIG. 2, the front wheels 4—4 shown in FIG. 1 are not in operation when the spinner is operative and for reasons of clarity are not shown. Actually these front wheels are lifted out of contact with the floor and perform no function other than to facilitate moving the device from a storage area to a position of use and vice versa.

The previously referred to feet 8, only two of which are shown in FIG. 2, are mounted on axles 11—11 to act as levers and the upper ends thereof are pivotally connected to the ends of a rod 12. Pivotally connected near to the center of rod 12 is one end of a link 13, the other end of which is pivoted to an end of a crank 14, which in its turn is fixedly mounted relative to a common shaft 15 supporting the control levers 6 and 6'.

It is clear from this description of the linkage means connecting feet 8—8 with levers 6 and 6' that, as shown in FIG. 2, when control levers 6 and 6' are in their advanced position (to the right in FIG. 2), the feet 8—8 are inclined clockwise causing the wheel spinner as a whole to be also in an advanced position, in which spinning drum 2 can engage wheel 7 as shown. The position shown in FIG. 2 is the forward or advanced end position of lever 6. If lever 6 or 6' is moved rearwardly from this position, crank 14 and link 13 will cause rod 12 to move rearwardly also, causing a counterclockwise rotation of feet 8—8 and the wheel spinner will move to a retracted position relative to wheel 7, and the spinning drum 2 will disengage wheel 7 when the feet 8—8 are vertical. Further rearward movement of lever 6 or 6' will cause the wheel spinner to move further away from wheel 7 and feet 8—8 to take a position of counterclockwise rotation. This position of the spinner is illustrated in FIG. 3.

Brakeshoe 3 is mounted on one end of an angular lever 16 pivoted on an axle 17. Pivoted to the other end of lever 16 is one end of a link 18, the other end of which is pivoted to one end of a crank 19, mounted coaxially with lever 6 in a freely movable manner relative thereto. Mounted integrally on shaft 15 is a catch member 20, as shown in FIG. 2, serving as a lost motion device for operating crank 19 in response to movement of lever 6. In the position shown in FIG. 2, the catch member 20 does not engage crank 19 and does not do so until lever 6 has been turned through an angle corresponding to the difference between the directions of lever 6 and crank 19 as shown in FIG. 2. It is clear from this that lever 6 actuates crank 19 with play and not until lever 6 has moved through the angle referred to does catch member 20 engage crank 19, thereby to move brake 3 into the operative position shown in FIG. 3.

Figure 4:
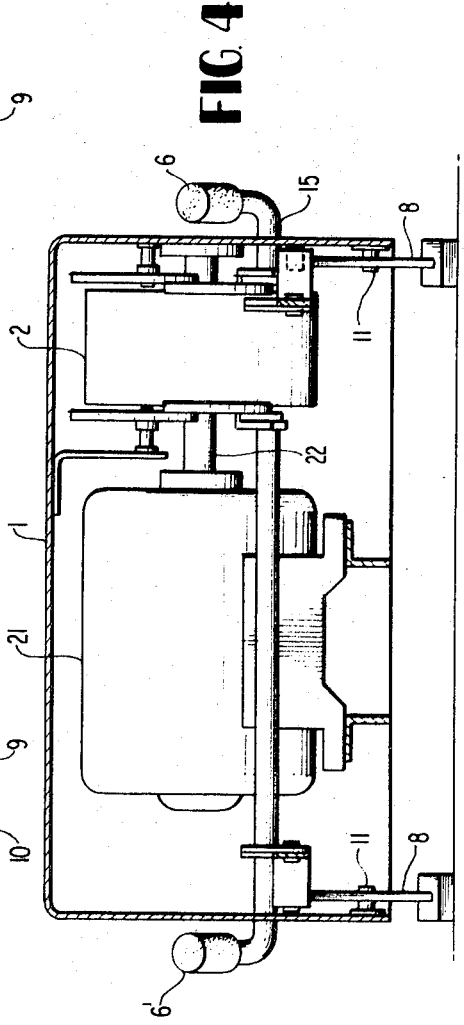
FIG. 4 is a sectional view taken on the line IV—IV of FIG. 3.

FIG. 4 shows the general arrangement of the components of the wheel spinner as they appear on a section taken on the line IV—IV of FIG. 3. The section shows, in addition to units already described, an electric motor 21 with its axle 22 arranged for driving drum 2.

FIG. 5 is a view of the critical structural portion of the linkage mechanisms corresponding to FIG. 2 and earlier described and shown on a larger scale.

In operation, the wheel spinner is rolled on its wheels 4 up to the vehicle wheel to be investigated and is then lowered so as to rest on feet 8—8 with levers 6 and 6' in neutral position and with spinning drum 2 in immediate proximity to wheel 7. In this position, feet 8—8 are vertical. Actuation of lever 6 or 6' in a forwardly direction toward wheel 7 causes the wheel spinner to advance in the same direction and drum 2 to engage wheel 7. As is seen from FIG. 2, the wheel spinner then rests on the forward edges 9 of feet 8—8 providing a firm grip on the supporting surface, which is improved further since drum 2 rotates counterclockwise, thereby tending to increase the pressure exerted by feet 8—8 on the supporting surface.

When sufficient speed has been imparted to wheel 7, lever 6 is either moved to its neutral position, in which feet 8—8 are vertical, and the spinner rests in equilibrium, or lever 6 may be moved further rearwardly if it is desired to brake wheel 7 to bring it to a stop. Such further movement of lever 6 causes rotation of feet 8—8 in a counterclockwise direction to the position in FIG. 3. In this position, rear edges 10 of feet 8 engage the ground surface and contribute to firmly supporting the spinner during the braking action.

That which is claimed is:

1. A wheel spinner comprising a frame structure, a spinning drum mounted in said frame structure, pivoted feet for supporting said frame structure, a brake means having an operative and an inoperative position and a control lever coupled by first linkage means to said feet and by second linkage means to said brake means.

2. A wheel spinner as claimed in claim 1, in which said control lever has a first end position coupled with an inclined position of said feet in a first direction, a second end position coupled with an inclined position of said feet in the opposite direction, and a neutral position, in which said feet are vertical.

3. A wheel spinner as claimed in claim 2, in which said feet have backward and forward edges for gripping a supporting surface in said inclined positions.

4. A wheel spinner as claimed in claim 2, comprising lost-motion means interposed in said second linkage means thereby to cause delayed response to said brake means upon actuation of said control lever.

5. A wheel spinner as claimed in claim 2, in which said control lever and said linkage means are adapted, when advanced towards said first end position, to advance the spinning drum and when advanced towards said second end position to retract the spinning drum and advance the brake means.

* * * * *